US012807141B2

(12) United States Patent
Uchibori

(10) Patent No.: US 12,807,141 B2
(45) Date of Patent: Nov. 24, 2026

(54) VEHICLE DRIVING ASSISTANCE APPARATUS

(71) Applicant: TOYOTA JIDOSHA KABUSHIKI KAISHA, Toyota (JP)

(72) Inventor: Yuta Uchibori, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 19/044,705

(22) Filed: Feb. 4, 2025

(65) Prior Publication Data

US 2025/0289418 A1 Sep. 18, 2025

(30) Foreign Application Priority Data

Mar. 15, 2024 (JP) ................................ 2024-040994

(51) Int. Cl.
*B60W 10/04* (2006.01)
*B60W 10/18* (2012.01)
*B60W 30/09* (2012.01)

(52) U.S. Cl.
CPC ............ *B60W 30/09* (2013.01); *B60W 10/04* (2013.01); *B60W 10/18* (2013.01); *B60W 2540/10* (2013.01); *B60W 2554/80* (2020.02); *B60W 2710/18* (2013.01)

(58) Field of Classification Search
None
See application file for complete search history.

(56) References Cited

U.S. PATENT DOCUMENTS

2016/0114799 A1* 4/2016 Kawasaki ............ B60W 10/04 701/70
2016/0214604 A1 7/2016 Kida et al.
2016/0221549 A1* 8/2016 Tanase ...................... B60T 7/22
2016/0240084 A1* 8/2016 Takeuchi ................. B60T 7/22
2016/0264108 A1* 9/2016 Harada ..................... B60T 7/22
2018/0043885 A1* 2/2018 Harada ................ B60W 30/09
2019/0009775 A1* 1/2019 Ito ............................ B60T 7/12
2021/0213974 A1* 7/2021 Shimbo ................. G08G 1/165

FOREIGN PATENT DOCUMENTS

JP 2015-047954 A 3/2015
JP 2021-109504 A 8/2021

* cited by examiner

*Primary Examiner* — James M Mcpherson
(74) *Attorney, Agent, or Firm* — Oliff PLC

(57) ABSTRACT

When there is a possibility that a vehicle collides with an object, a vehicle driving assistance apparatus executes a driving force limitation control to limit an applied driving force to a predetermined driving force or less, and an automatic braking control to automatically brake the vehicle and stop the vehicle. The apparatus stops the driving force limitation control and the automatic braking control when a predetermined stop condition is satisfied after stopping the vehicle, and applies to the vehicle a requested driving force. When the predetermined stop condition is satisfied and the apparatus applies a driving force greater than the predetermined driving force to the vehicle, the apparatus executes a driving force restoration control to change a manner of increasing the applied driving force to the requested driving force depending on a relative relationship between the vehicle and the object.

2 Claims, 5 Drawing Sheets

VEHICLE DRIVING ASSISTANCE APPARATUS

CROSS-REFERENCE TO RELATED APPLICATIONS

This application claims priority to Japanese patent application No. JP 2024-040994 filed on Mar. 15, 2024, the content of which is hereby incorporated by reference in its entirety.

BACKGROUND

Field

The present invention relates to a vehicle driving assistance apparatus.

Description of the Related Art

There is known a vehicle driving assistance apparatus that, when there is a possibility that an own vehicle collides with an object ahead of the own vehicle, executes a driving force limitation control to limit a driving force applied to the own vehicle to a predetermined driving force or less, and executes an automatic braking control to automatically brake the own vehicle and stop the own vehicle before the own vehicle collides with the object. As such a vehicle driving assistance apparatus, there is also known a vehicle driving assistance apparatus that, when a predetermined stop condition is satisfied after stopping the own vehicle by the driving force limitation control and the automatic braking control, stops the driving force limitation control and the automatic braking control and applies to the own vehicle, the driving force corresponding to an amount of operation of an accelerator pedal by a driver of the own vehicle (see, for example, JP 2021-109504 A).

In the situation where the driving force corresponding to the amount of operation of the accelerator pedal is applied to the own vehicle when the automatic braking control is stopped after the own vehicle is stopped by the automatic braking control, when the driving force applied to the own vehicle is increased in the same manner regardless of a relative relationship between the own vehicle and the object, an acceleration of the own vehicle may be extremely small even when the object is not present near the own vehicle, thereby causing discomfort to the driver.

SUMMARY

An object of the present invention is to provide a vehicle driving assistance apparatus that can reduce discomfort to the driver when applying to the own vehicle, the driving force corresponding to the amount of operation of the accelerator pedal when stopping the automatic braking control after stopping the own vehicle by the automatic braking control.

A vehicle driving assistance apparatus according to the present invention comprises an electronic control unit which, when there is a possibility that an own vehicle collides with an object ahead of the own vehicle, executes a driving force limitation control to limit an applied driving force, which is applied to the own vehicle, to a predetermined driving force or less, and executes an automatic braking control to automatically brake the own vehicle and stop the own vehicle before the own vehicle collides with the object. The electronic control unit is configured to stop the driving force limitation control and the automatic braking control when a predetermined stop condition is satisfied after stopping the own vehicle by the driving force limitation control and the automatic braking control, and to apply to the own vehicle a requested driving force, which corresponds to an amount of operation of an accelerator pedal by a driver of the own vehicle. Further, the electronic control unit is configured to, when the predetermined stop condition is satisfied and the electronic control unit applies a driving force greater than the predetermined driving force to the own vehicle, execute a driving force restoration control to change a manner of increasing the applied driving force to the requested driving force depending on a relative relationship between the own vehicle and the object.

In the situation where the requested driving force is applied to the own vehicle when the automatic braking control is stopped after the own vehicle is stopped by the automatic braking control, when the applied driving force is increased in the same manner regardless of the relative relationship between the own vehicle and the object, an acceleration of the own vehicle may be extremely small even when the object is not present near the own vehicle, thereby causing discomfort to the driver.

According to the vehicle driving assistance apparatus of the present invention, when the requested driving force is applied to the own vehicle when the automatic braking control is stopped after the vehicle is stopped by the automatic braking control, the manner of increasing the applied driving force to the requested driving force is changed depending on the relative relationship between the own vehicle and the object. This makes it possible to prevent discomfort to the driver.

In the vehicle driving assistance apparatus according to an aspect of the present invention, the relative relationship may be a distance between the own vehicle and the object. In this aspect, the electronic control unit may be configured to change the manner of increasing the applied driving force by increasing a gradient of increase of the applied driving force when the distance is equal to or greater than a predetermined distance, compared to when the distance is less than the predetermined distance.

In the situation where the object moves away from the own vehicle, etc., and the distance between the own vehicle and the object is long, when the applied driving force is increased slowly, the driver may feel discomfort. According to the vehicle driving assistance apparatus of this aspect of the present invention, when the object moves away from the own vehicle, the applied driving force is increased promptly. This makes it possible to prevent the driver from feeling uncomfortable.

In the vehicle driving assistance apparatus according to another aspect of the present invention, the electronic control unit may be configured to stop the driving force restoration control when the applied driving force reaches the requested driving force.

According to the vehicle driving assistance apparatus of this aspect of the present invention, unnecessary continuation of the driving force restoration control is prevented after the applied driving force reaches the requested driving force.

The components of the present invention are not limited to the embodiments of the present invention described below with reference to the drawings. Other objects, other features, and associated advantages of the present invention will be easily understood from the description of the embodiments of the present invention.

DETAILED DESCRIPTION

Figure 1:
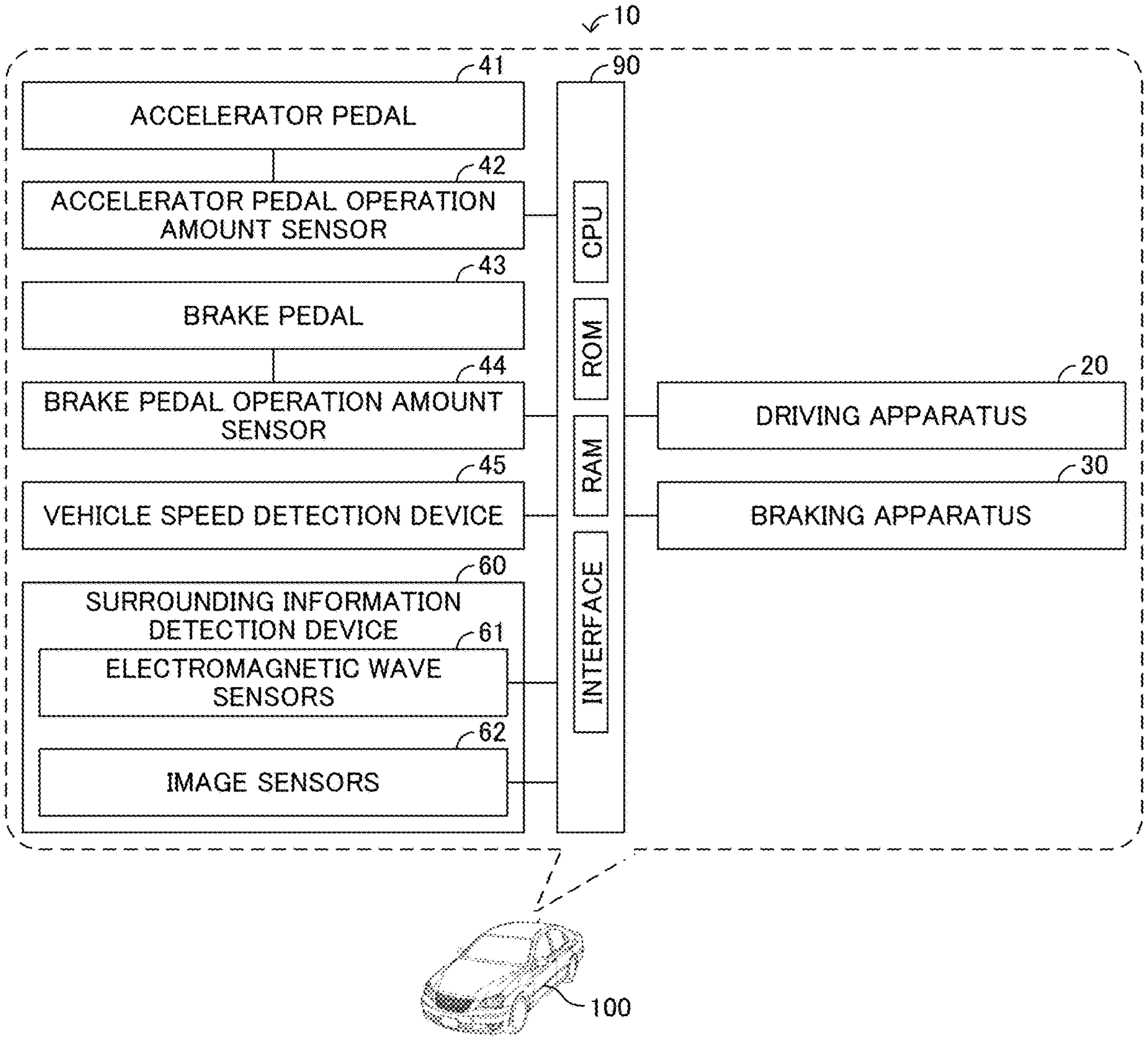
FIG. 1 is a diagram showing a vehicle driving assistance apparatus according to an embodiment of the present invention.

Below, a vehicle driving assistance apparatus according to an embodiment of the present invention will be described with reference to the drawings. FIG. 1 shows the vehicle driving assistance apparatus 10 according to the embodiment of the present invention. The vehicle driving assistance apparatus 10 is installed in an own vehicle 100.

As shown in FIG. 1, the vehicle driving assistance apparatus 10 is equipped with an ECU (electronic control unit) 90 as a control device. The ECU 90 is equipped with a microcomputer as a main component. The microcomputer includes a CPU, ROM, RAM, and non-volatile memory, etc., as a storage medium, as well as interfaces, etc. The CPU is configured to execute instructions, programs, or routines stored in the storage medium to realize various functions. In particular, in this embodiment, the vehicle driving assistance apparatus 10 stores in the storage medium, programs that realize various controls executed by the vehicle driving assistance apparatus 10.

It should be noted that, in this embodiment, the vehicle driving assistance apparatus 10 is provided with only one ECU 90, but it may be provided with multiple ECUs and configured such that functions of the vehicle driving assistance apparatus 10 described below are performed by each ECU.

The vehicle driving assistance apparatus 10 may be configured such that the programs stored in the storage medium can be updated by wireless communication (e.g., Internet communication) with an external device.

The own vehicle 100 is equipped with a driving apparatus 20 and a braking apparatus 30. The driving apparatus 20 and the braking apparatus 30 are electrically connected to the ECU 90 respectively. The driving apparatus 20 is equipped with an internal combustion engine and/or at least one motor generator. The vehicle driving assistance apparatus 10 controls a magnitude of an applied driving force Pa, i.e., a driving force applied to the own vehicle 100 from the driving apparatus 20 by controlling an operation of the driving apparatus 20. The braking apparatus 30 is equipped with a hydraulic brake device and an electric parking brake device. The vehicle driving assistance apparatus 10 controls a magnitude of a braking force applied to the own vehicle 100 from the braking apparatus 30 by controlling an operation of the braking apparatus 30.

Furthermore, the own vehicle 100 is equipped with an accelerator pedal 41, an accelerator pedal operation amount sensor 42, a brake pedal 43, a brake pedal operation amount sensor 44, a vehicle speed detection device 45, and a surrounding information detection device 60. The surrounding information detection device 60 is equipped with electromagnetic wave sensors 61 and image sensors 62. The accelerator pedal operation amount sensor 42, the brake pedal operation amount sensor 44, the vehicle speed detection device 45, the electromagnetic wave sensors 61, and the image sensors 62 are electrically connected to the ECU 90, respectively.

The vehicle driving assistance apparatus 10 acquires as an accelerator pedal operation amount AP, an amount of operation of the accelerator pedal 41 by the accelerator pedal operation amount sensor 42. The vehicle driving assistance apparatus 10 acquires as a requested driving force Pr, the driving force requested to be applied to the own vehicle 100 based on the accelerator pedal operation amount AP and a moving speed of the own vehicle 100. When a first driving force limitation control, a second driving force limitation control or a driving force restoration control described later is not executed, the vehicle driving assistance apparatus 10 controls the operation of the driving apparatus 20 such that the requested driving force Pr is applied to the own vehicle 100.

In addition, the vehicle driving assistance apparatus 10 acquires an amount of operation of the brake pedal 43 as a brake pedal operation amount BP by the brake pedal operation amount sensor 44. The vehicle driving assistance apparatus 10 acquires as a requested braking force, the braking force that is requested to be applied to the own vehicle 100 based on the brake pedal operation amount BP. When an automatic braking control described below is not executed, the vehicle driving assistance apparatus 10 controls the operation of the braking apparatus 30 such that the requested braking force is applied to the own vehicle 100.

In addition, the vehicle driving assistance apparatus 10 acquires the moving speed of the own vehicle 100 as an own vehicle speed V by the vehicle speed detection device 45.

In addition, the electromagnetic wave sensor 61 is a radio wave sensor such as a millimeter wave radar or an ultrasonic sensor such as a clearance sonar. The vehicle driving assistance apparatus 10 acquires object information IO, i.e., information on objects existing ahead of the own vehicle 100 as surrounding information IS by the electromagnetic wave sensors 61. In addition, the image sensor 62 is, for example, a camera. The vehicle driving assistance apparatus 10 acquires image information IC of the front of the own vehicle 100 as the surrounding information IS by the image sensors 62.

Operation of Vehicle Driving Assistance Apparatus

Next, An operation of the vehicle driving assistance apparatus 10 will be described. When predetermined conditions are satisfied, the vehicle driving assistance apparatus 10 executes the driving force limitation control and the automatic braking control as the automatic driving control. Further, when another predetermined condition is satisfied after starting of the driving force limitation control and the automatic braking control, the vehicle driving assistance apparatus 10 stops the driving force limitation control and the automatic braking control, and executes the driving force restoration control as the automatic driving control. Furthermore, when yet another predetermined condition is satisfied, the vehicle driving assistance apparatus 10 stops the driving force restoration control.

Figure 2:
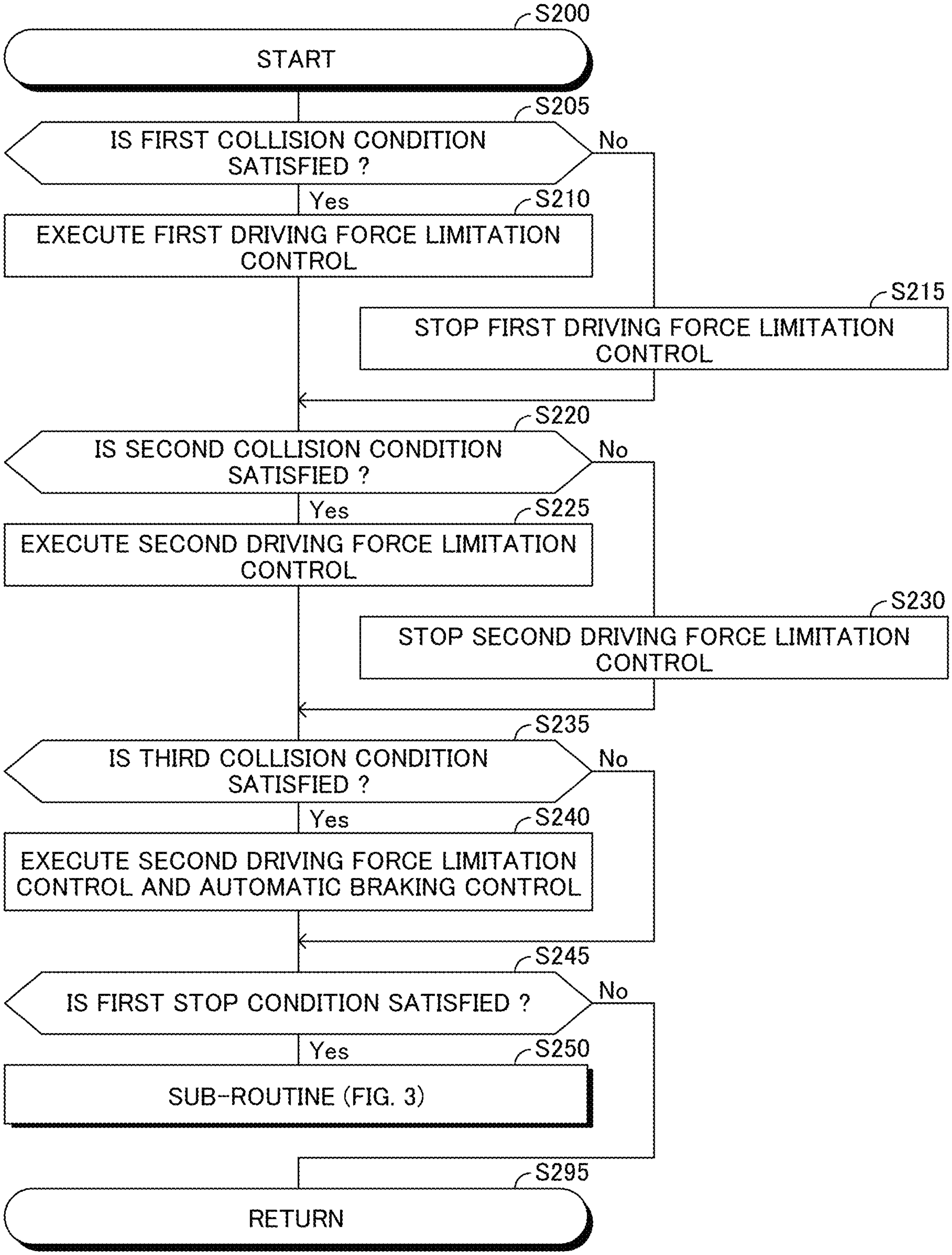
FIG. 2 is a flowchart showing a routine executed by the vehicle driving assistance apparatus according to the embodiment of the present invention.
Figure 3:
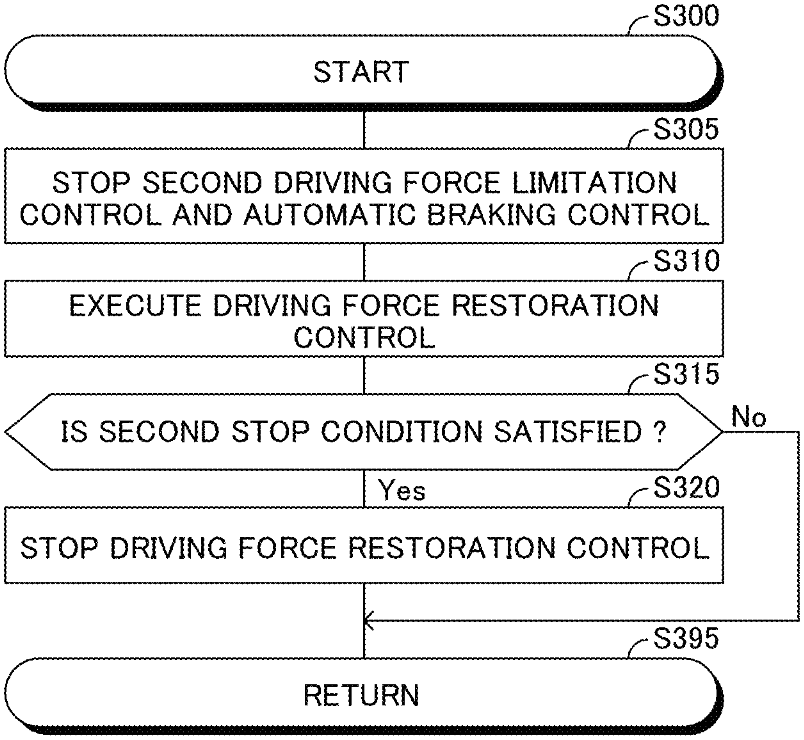
FIG. 3 is a flowchart showing a routine executed by the vehicle driving assistance apparatus according to the embodiment of the present invention.

The vehicle driving assistance apparatus 10 is configured to execute and stop the driving force limitation control and the automatic braking control, and to execute and stop the driving force restoration control, by executing routines shown in FIG. 2 and FIG. 3.

The vehicle driving assistance apparatus 10 executes the routine shown in FIG. 2 at predetermined time intervals. Therefore, at a predetermined timing, the vehicle driving assistance apparatus 10 starts a process from a step S200 of the routine shown in FIG. 2, proceeds with the process to a step S205, and determines whether or not a first collision condition CC1 is satisfied.

Figure 4:
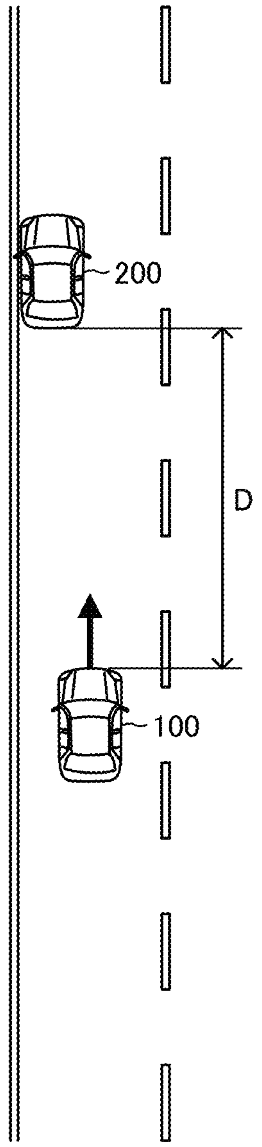
FIG. 4 is a diagram showing a scene in which an object is present ahead of an own vehicle.

The first collision condition CC1 is a condition in which in the situation where an object 200 exists on a path of the own vehicle 100 ahead of the own vehicle 100 in a travelling direction of the own vehicle 100, there is a possibility that the own vehicle 100 collides with the object 200 as shown in FIG. 4. More specifically, the first collision condition CC1 is a condition in which an object distance D is less than or equal to a first distance threshold D1 and greater than a second distance threshold D2. The object distance D is the distance between the own vehicle 100 and the object 200. The vehicle driving assistance apparatus 10 detects the object 200 based on the surrounding information IS and acquires the object distance D based on the surrounding information IS.

It should be noted that the first distance threshold D1 is set to a value that is greater than the second distance threshold D2. In addition, the first distance threshold D1 and the second distance threshold D2 may each be a constant value that is independent of the own vehicle speed V. However, in this embodiment, the first distance threshold D1 and the second distance threshold D2 increase as a relative speed of the own vehicle 100 to the object 200 increases. Therefore, in this embodiment, the first collision condition CC1 may be a condition in which an object arrival time TTC, i.e., a time required for the own vehicle 100 to reach the object 200 is equal to or less than a first time threshold TTC1 and longer than a second time threshold TTC2. It should be noted that in this case, the first time threshold TTC1 is set to a time longer than the second time threshold TTC2.

The vehicle driving assistance apparatus 10 acquires the relative speed of the own vehicle 100 with respect to the object 200 based on the surrounding information IS. In addition, the vehicle driving assistance apparatus 10 acquires the object arrival time TTC based on the object distance D and the relative speed of the own vehicle 100 with respect to the object 200.

It should be noted that the object 200 shown in FIG. 3 is a vehicle, but the object 200 may also be a person, a two-wheeled vehicle, or a structure.

When the vehicle driving assistance apparatus 10 determines "Yes" at the step S205, the vehicle driving assistance apparatus 10 proceeds with the process to a step S210 and executes the first driving force limitation control as the driving force limitation control. The vehicle driving assistance apparatus 10 then proceeds with the process to a step S220.

Figure 5:
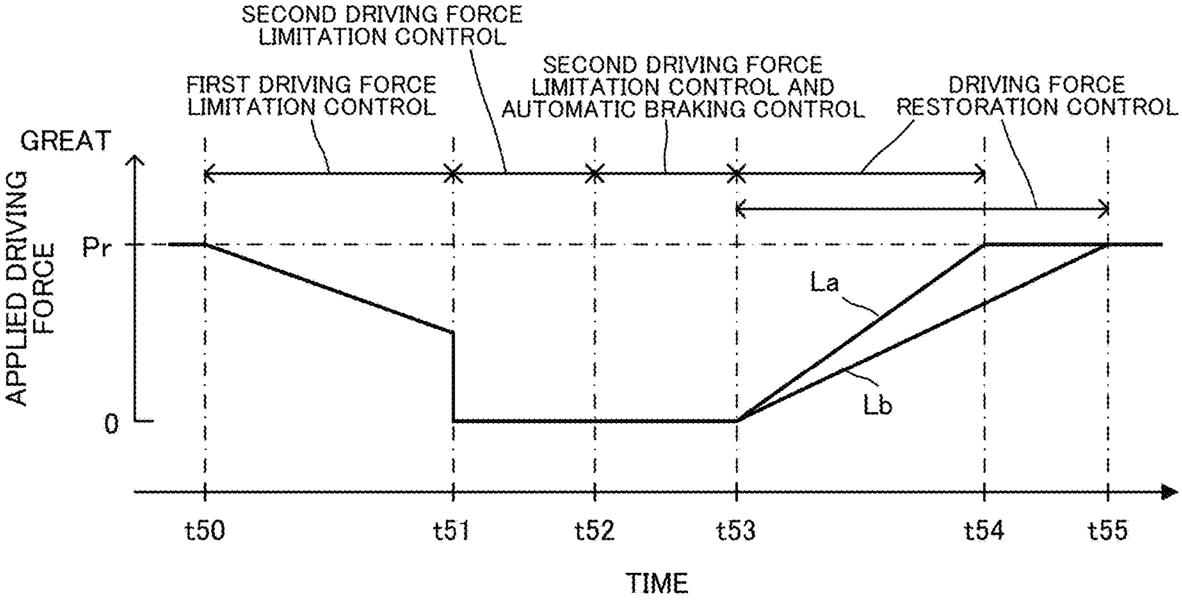
FIG. 5 shows change of a driving force applied to the own vehicle when the driving force limitation control, the automatic braking control, and the driving force restoration control are executed.

The first driving force limitation control is a control that limits the applied driving force Pa (i.e., the driving force applied to the own vehicle 100) to a predetermined driving force Pg1 or less. In this embodiment, the predetermined driving force Pg1 is set to a value which decreases as the object distance D decreases. In particular, the predetermined driving force Pg1 is set to a value greater than zero. Therefore, as shown in FIG. 5, when the first collision condition CC1 becomes satisfied at a time t50, and the requested driving force Pr is greater than the predetermined driving force Pg1, the applied driving force Pa decreases over time.

It should be noted that the first driving force limitation control is stopped when the driver operates the brake pedal 43 or a shift lever (not shown) to decelerate the own vehicle 100.

On the other hand, when the vehicle driving assistance apparatus 10 determines "No" at the step S205, the vehicle driving assistance apparatus 10 proceeds with the process to a step S215, and when the first driving force limitation control is being executed at this time, the vehicle driving assistance apparatus 10 stops the first driving force limitation control. The vehicle driving assistance apparatus 10 then proceeds with the process to the step S220.

When the vehicle driving assistance apparatus 10 proceeds with the process to the step S220, the vehicle driving assistance apparatus 10 determines whether or not a second collision condition CC2 is satisfied.

The second collision condition CC2 is a condition in which in the situation where the object 200 exists on the path of the own vehicle 100 ahead of the own vehicle 100 in the travelling direction of the own vehicle 100, there is a possibility that the own vehicle 100 collides with the object 200. More specifically, the second collision condition CC2 is a condition in which the object distance D is less than or equal to the second distance threshold D2 and greater than a third distance threshold D3. It should be noted that the second distance threshold D2 is set to a value that is greater than the third distance threshold D3. In addition, the third distance threshold D3 may be a constant value that is independent of the own vehicle speed V. However, in this embodiment, the third distance threshold D3 is set to a distance which increases as the relative speed of the own vehicle 100 to the object 200 increases. Therefore, in this embodiment, the second collision condition CC2 may be a condition in which the object arrival time TTC is less than or equal to the second time threshold TTC2 and longer than the third time threshold TTC3. It should be noted that the second time threshold TTC2 is set to a time longer than the third time threshold TTC3.

When the vehicle driving assistance apparatus 10 determines "Yes" at the step S220, the vehicle driving assistance apparatus 10 proceeds with the process to a step S225 and executes the second driving force limitation control as the driving force limitation controls. The vehicle driving assistance apparatus 10 then proceeds with the process to a step S235.

The second driving force limitation control is a control that limits the applied driving force Pa to a predetermined driving force Pg2 or less. In this embodiment, in particular, the predetermined driving force Pg2 is set to zero. Therefore, in this embodiment, the second driving force limitation control is a control of stopping applying the driving force to the own vehicle 100. Therefore, In the situation where the driving force limitation control is being executed, the vehicle driving assistance apparatus 10 sets the applied driving force Pa to zero even when the requested driving force Pr is greater than zero. In other words, as shown in FIG. 5, when the second collision condition CC2 becomes satisfied at a time t51, the second driving force limitation control is started and the applied driving force Pa is set to zero.

It should be noted that the second driving force limitation control executed at the step S225 is stopped when the driver operates the brake pedal 43 or when the driver operates the shift lever (not shown) to decelerate the own vehicle 100.

On the other hand, when the vehicle driving assistance apparatus 10 determines "No" at the step S220, the vehicle driving assistance apparatus 10 proceeds with the process to a step S230, and when the second driving force limitation control is being executed at this time, the vehicle driving assistance apparatus 10 stops the second driving force limitation control. The vehicle driving assistance apparatus 10 then proceeds with the process to the step S235.

When the vehicle driving assistance apparatus 10 proceeds with the process to the step S235, the vehicle driving assistance apparatus 10 determines whether or not a third collision condition CC3 is satisfied.

The third collision condition CC3 is a condition in which in the situation where the object 200 exists on the path of the own vehicle 100 ahead of the own vehicle 100 in the travelling direction of the own vehicle 100, there is a possibility that the own vehicle 100 collides with the object 200. More specifically, the third collision condition CC3 is a condition in which the object distance D is less than or equal to the third distance threshold D3. It should be noted that the third collision condition CC3 may also be a condition in which the object arrival time TTC is less than or equal to the third time threshold TTC3.

When the vehicle driving assistance apparatus 10 determines "Yes" at the step S235, the vehicle driving assistance apparatus 10 proceeds with the process to a step S240 and executes the second driving force limitation control and the automatic braking control. In other words, as shown in FIG. 5, when the third collision condition CC3 becomes satisfied at a time t52, the second driving force limitation control and the automatic braking control are started. It should be noted that the automatic braking control is a control of automatically braking the own vehicle 100 and stops the own vehicle 100 before the own vehicle 100 collides with the object 200. The vehicle driving assistance apparatus 10 then proceeds with the process to a step S245.

In this way, when the own vehicle 100 has a possibility of colliding with the object 200 ahead of the own vehicle 100, the vehicle driving assistance apparatus 10 executes the second driving force limitation control that limits the applied driving force Pa applied to the own vehicle 100, to the predetermined driving force power Pg2 or less, and executes the automatic braking control to automatically brake the own vehicle 100 and stop the own vehicle 100 before the own vehicle 100 collides with the object 200.

On the other hand, when the vehicle driving assistance apparatus 10 determines "No" at the step S235, the vehicle driving assistance apparatus 10 proceeds with the process directly to the step S245.

When the vehicle driving assistance apparatus 10 proceeds with the process to the step S245, the vehicle driving assistance apparatus 10 determines whether or not a first stop condition CS1 is satisfied. The first stop condition CS1 is a condition in which the own vehicle 100 has been stopped by the automatic braking control and the state in which the own vehicle 100 has been stopped has continued for a predetermined period of time (i.e., a predetermined stop continuation period of time Ts_th). However, the first stop condition CS1 may be a condition in which the own vehicle 100 is stopped by the automatic braking control.

When the vehicle driving assistance apparatus 10 determines "No" at the step S245, the vehicle driving assistance apparatus 10 proceeds with the process directly to a step S295 and terminates the process of this routine once.

On the other hand, when the vehicle driving assistance apparatus 10 determines "Yes" at the step S245, the vehicle driving assistance apparatus 10 proceeds with the process to a step S250 and executes the routine shown in FIG. 3. Therefore, when the vehicle driving assistance apparatus 10 proceeds with the process to the step S250, the vehicle driving assistance apparatus 10 starts a process from a step S300 of the routine shown in FIG. 3, proceeds with the process to a step S305, and stops the second driving force limitation control and the automatic braking control. The vehicle driving assistance apparatus 10 then proceeds with the process to a step S310 and executes a driving force restoration control. Therefore, the first stop condition CS1 is a condition for stopping the second driving force limitation control and the automatic braking control, as well as a condition for executing the driving force restoration control.

The driving force restoration control is a control of increasing the applied driving force Pa towards the requested driving force Pr at a predetermined gradient θth. In other words, the driving force restoration control is a control of increasing the applied driving force Pa towards the requested driving force Pr at a predetermined increase rate Rth. The predetermined increase rate Rth is the amount by which the applied driving force Pa increases per unit of time. In addition, the predetermined gradient θth and predetermined increase rate Rth are set to greater values, respectively when the object distance D is greater than or equal to a predetermined distance Dth than when the object distance D is less than the predetermined distance Dth. In particular, in this embodiment, the predetermined gradient θth and predetermined increase rate Rth are set to values, respectively which increase when the object distance D increases.

Therefore, as shown in FIG. 5, when the first stop condition CS1 becomes satisfied at a time t53 and the object distance D is greater than or equal to the predetermined distance Dth, the applied driving force Pa increases along the line indicated by a reference symbol La, and the applied driving force Pa reaches the requested driving force Pr at a time t54. On the other hand, when the first stop condition CS1 becomes satisfied at time t53 and the object distance D is less than the predetermined distance Dth, the applied driving force Pa increases along the line indicated by a reference symbol Lb, and the applied driving force Pa reaches the requested driving force Pr at a time t55, which is later than the time t54. In other words, when the first stop condition CS1 becomes satisfied at time t53 and the object distance D is greater than or equal to the predetermined distance Dth, the applied driving force Pa reaches the requested driving force Pr in a shorter time than when the object distance D is shorter than the predetermined distance Dth.

In this way, the vehicle driving assistance apparatus 10 is configured to stop the second driving force limitation control and the automatic braking control and apply the requested driving force Pr to the own vehicle 100 when the first stop condition CS1 (a predetermined stop condition) becomes satisfied after stopping the own vehicle 100 by the second driving force limitation control and the automatic braking control. Furthermore, when the first stop condition CS1 (the predetermined stop condition) becomes satisfied and the vehicle driving assistance apparatus 10 applies the driving force greater than the predetermined driving force Pg2 to the own vehicle 100, the vehicle driving assistance apparatus 10 executes the driving force restoration control, which changes a manner of increasing the applied driving force Pa to the requested driving force Pr depending on the object distance D (i.e., a relative relationship between the own vehicle 100 and the object 200).

In addition, when the driver erroneously operates the accelerator pedal 41 at the point of time when the own vehicle 100 is stopped by the automatic braking control, the applied driving force Pa does not increase all at once to the requested driving force Pr, but increases gradually by the driving force restoration control. This also prevents the own vehicle 100 from making a sudden start.

It should be noted that when the accelerator pedal operation amount AP is zero at the point of time when the first stop condition CS1 becomes satisfied, the applied driving force Pa is equal to the requested driving force Pr. Therefore, in effect, the driving force restoration control is not executed.

The vehicle driving assistance apparatus 10 then proceeds with the process to a step S315 to determine whether a second stop condition CS2 is satisfied.

The second stop condition CS2 is one of the following conditions: the applied driving force Pa has reached the requested driving force Pr, the driver has released the accelerator pedal 41, or the time that has elapsed since the start of the driving force restoration control (a restoration continuation period of time Tr) has reached a predetermined restoration continuation period of time Tr_th.

When the vehicle driving assistance apparatus 10 determines "No" at the step S315, the vehicle driving assistance apparatus 10 proceeds with the process directly to a step S395 and terminates the process of this routine once.

On the other hand, when the vehicle driving assistance apparatus 10 determines "Yes" at the step S315, the vehicle driving assistance apparatus 10 proceeds with the process to a step S320 and stops the driving force restoration control. The vehicle driving assistance apparatus 10 then proceeds with the process to the step S395 and terminates the process of this routine once. It should be noted that in this case, the vehicle driving assistance apparatus 10 determines that the first stop condition CS1 is not satisfied at the step S245 of the routine shown in FIG. 2. In the example shown in FIG. 5, the second stop condition CS2 becomes satisfied at the time t54 or the time t55, and the driving force restoration control is stopped.

This is the operation of the vehicle driving assistance apparatus 10.

In the situation where the requested driving force Pr is applied to the own vehicle 100 when the automatic braking control is stopped after the own vehicle 100 is stopped by the automatic braking control, when the applied driving force Pa is increased in the same way regardless of the object distance D, the acceleration of the own vehicle 100 may be extremely small even though the object 200 is not near the own vehicle 100, and this may cause discomfort to the driver.

According to the vehicle driving assistance apparatus 10, when the requested driving force Pr is applied to the own vehicle 100 when the automatic braking control is stopped after the own vehicle 100 is stopped by the automatic braking control, the driving force restoration control is executed and the manner of increasing the applied driving force Pa to the requested driving force Pr is changed depending on the object distance D. Therefore, it is possible to suppress the possibility of causing discomfort to the driver.

It should be noted that the present invention is not limited to the above embodiments, and various modified examples can be adopted within the scope of the present invention.

What is claimed is:

1. A vehicle driving assistance apparatus comprising an electronic control unit which, when there is a possibility that an own vehicle collides with an object ahead of the own vehicle, executes a driving force limitation control to limit an applied driving force, which is applied to the own vehicle, to a predetermined driving force or less, and executes an automatic braking control to automatically brake the own vehicle and stop the own vehicle before the own vehicle collides with the object, the electronic control unit being configured to stop the driving force limitation control and the automatic braking control when a predetermined stop condition is satisfied after stopping the own vehicle by the driving force limitation control and the automatic braking control, and to apply to the own vehicle a requested driving force, which corresponds to an amount of operation of an accelerator pedal by a driver of the own vehicle, wherein the electronic control unit is configured to, when the predetermined stop condition is satisfied and the electronic control unit applies a driving force greater than the predetermined driving force to the own vehicle, execute a driving force restoration control to change a manner of increasing the applied driving force to the requested driving force depending on a distance between the own vehicle and the object, and wherein the electronic control unit is configured to change the manner of increasing the applied driving force by increasing a gradient of increase of the applied driving force when the distance is equal to or greater than a predetermined distance, compared to when the distance is less than the predetermined distance.

2. The vehicle driving assistance apparatus according to claim 1, wherein the electronic control unit is configured to stop the driving force restoration control when the applied driving force reaches the requested driving force.

* * * * *